(12) United States Patent
Day et al.

(10) Patent No.: US 8,692,767 B2
(45) Date of Patent: Apr. 8, 2014

(54) INPUT DEVICE AND METHOD FOR VIRTUAL TRACKBALL OPERATION

(75) Inventors: Shawn P. Day, San Jose, CA (US); Richard R. Schediwy, Union City, CA (US)

(73) Assignee: Synaptics Incorporated, San Jose, CA (US)

( * ) Notice: Subject to any disclaimer, the term of this patent is extended or adjusted under 35 U.S.C. 154(b) by 882 days.

(21) Appl. No.: 12/147,133

(22) Filed: Jun. 26, 2008

(65) Prior Publication Data

US 2009/0015559 A1 Jan. 15, 2009

Related U.S. Application Data

(60) Provisional application No. 60/949,787, filed on Jul. 13, 2007.

(51) Int. Cl.
*G09G 5/00* (2006.01)

(52) U.S. Cl.
USPC ........... 345/157; 345/167; 345/163; 345/165; 345/173; 715/863; 715/858; 463/37; 463/38

(58) Field of Classification Search
CPC ..... G06F 3/033; G06F 3/038; G06F 3/03547; G06F 3/0481; G06F 3/04892; G06F 2200/1637
USPC ......... 345/167, 156–157, 163, 165, 173–179; 463/37–38; 715/858–860, 863, 784; 178/18.01–18.09
See application file for complete search history.

(56) References Cited

U.S. PATENT DOCUMENTS

| | | | | |
|---|---|---|---|---|
| RE28,598 | E * | 10/1975 | Baer et al. ........................ 463/3 |
| 4,734,685 | A * | 3/1988 | Watanabe ..................... 345/157 |
| 5,327,161 | A * | 7/1994 | Logan et al. .................. 345/157 |
| 5,424,756 | A * | 6/1995 | Ho et al. ....................... 345/158 |
| 6,219,032 | B1 * | 4/2001 | Rosenberg et al. ........... 345/157 |
| 6,323,846 | B1 | 11/2001 | Westerman et al. |
| 6,353,850 | B1 | 3/2002 | Wies et al. |
| 7,167,162 | B2 * | 1/2007 | Gordon ......................... 345/173 |
| 7,168,047 | B1 * | 1/2007 | Huppi .......................... 715/784 |
| 2004/0212587 | A1 * | 10/2004 | Kong ............................. 345/156 |
| 2006/0031786 | A1 | 2/2006 | Hillis et al. |
| 2006/0288314 | A1 * | 12/2006 | Robertson ..................... 715/863 |
| 2007/0220448 | A1 * | 9/2007 | Trewin .......................... 715/856 |

OTHER PUBLICATIONS

Sumi Yun et al., "Design and Comparison of Acceleration Methods for Touchpad," CHI 2007 Work-in-Progress, Apr. 28-May 3, 2007, San Jose, CA, 6 pages.

* cited by examiner

*Primary Examiner* — Lun-Yi Lao
*Assistant Examiner* — MD Saiful A Siddiqui
(74) *Attorney, Agent, or Firm* — Ingrassia Fisher & Lorenz P.C.

(57) ABSTRACT

Input devices and methods are provided in which a sensing system is adapted to detect motion of an object on a surface and a processing system is coupled to the sensing system. The processing system is adapted to effect movement of a display pointer on a display in a first direction in response to motion of the object on the surface and effect continued movement of the display pointer in the first direction in response to the object being removed from the surface.

26 Claims, 9 Drawing Sheets

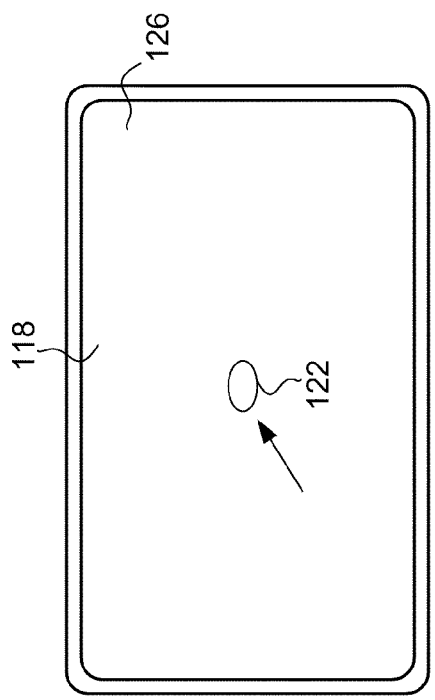
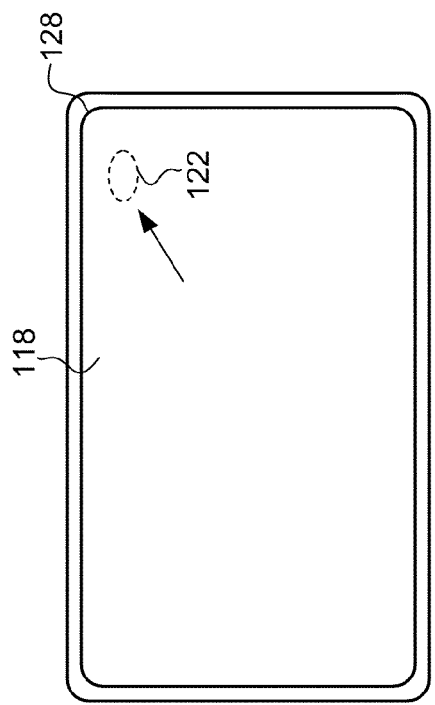
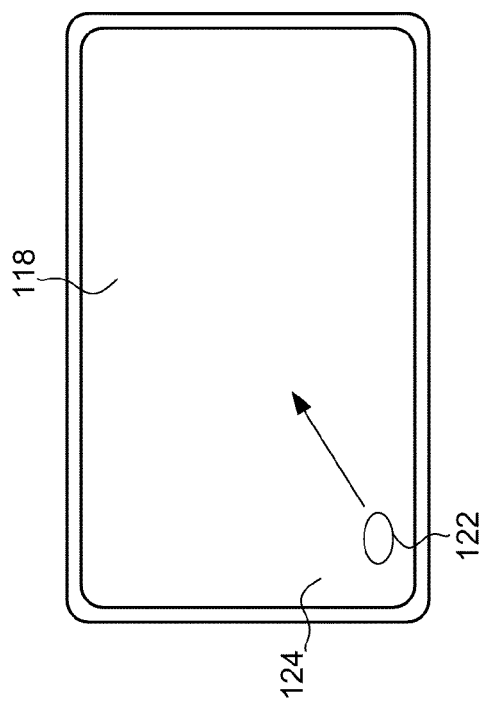
FIG. 5
FIG. 6
FIG. 7

INPUT DEVICE AND METHOD FOR VIRTUAL TRACKBALL OPERATION

PRIORITY DATA

This application claims priority of U.S. Provisional Patent Application Ser. No. 60/949,787, filed on Jul. 13, 2007, which is hereby incorporated herein by reference.

FIELD OF THE INVENTION

This invention generally relates to electronic devices, and more specifically relates to input devices, such as proximity sensor devices.

BACKGROUND OF THE INVENTION

Proximity sensor devices (also commonly called touchpads or touch sensor devices) are widely used in a variety of electronic systems. A proximity sensor device typically includes a sensing region, often demarked by a surface, which uses capacitive, resistive, inductive, optical, acoustic and/or other technology to determine the presence, location and/or motion of one or more fingers, styli, and/or other objects. The proximity sensor device, together with finger(s) and/or other object(s), may be used to provide an input to the electronic system. For example, proximity sensor devices are used as input devices for larger computing systems, such as those found integral within notebook computers or peripheral to desktop computers. Proximity sensor devices are also used in smaller systems, including handheld systems such as personal digital assistants (PDAs), remote controls, digital cameras, video cameras, communication systems such as wireless telephones and text messaging systems. Increasingly, proximity sensor devices are used in media systems, such as CD, DVD, MP3, video or other media recorders or players.

Many electronic devices include a user interface (UI) and an input device for interacting with the UI (e.g., interface navigation). A typical UI includes a screen for displaying graphical and/or textual elements. The increasing use of this type of UI has led to a rising demand for proximity sensor devices as pointing devices. In these applications the proximity sensor device may function as a value adjustment device, cursor control device, selection device, scrolling device, graphics/character/handwriting input device, menu navigation device, gaming input device, button input device, keyboard and/or other input device.

There is a continuing need for improvements in input devices. In particular, there is a continuing need for improvements in the usability of proximity sensors as pointing devices in UI applications.

BRIEF SUMMARY OF THE INVENTION

An input device is provided. The input device includes a sensing system adapted to detect motion of an object on a surface and a processing system coupled to the sensing system. The processing system is adapted to effect movement of a display pointer on a display in a first direction in response to motion of the object on the surface, effect continued movement of the display pointer in the first direction in response to the object being removed from the surface, and effect movement of the display pointer in a second direction on the display in response to the display pointer reaching an edge portion of the display during the continued movement in the first direction. The second direction is different from the first direction.

A method is provided. Movement of a display pointer on a display is effected in a first direction towards an edge portion of the display in response to detecting motion of an object on a surface. Continued movement of the display pointer in the first direction is effected in response to detecting the object leaving the surface if the object is moving during a selected time period before the object leaves the surface. Continued movement of the display pointer is effected in a second direction on the display away from the edge portion of the display in response to the display pointer reaching the edge portion of the display during the continued movement in the first direction.

A program product is provided. The program product includes an input device program and computer-readable media bearing the input device program. The input device program is adapted to detect motion of an object on a surface of an input device, effect movement of a display pointer on a display in a first direction towards an edge portion of the display in response to motion of the object on the surface, effect continued movement of the display pointer in the first direction in response to the object being removed from the surface within a selected time period of the motion of the object on the surface, and effect movement of the display pointer in a second direction on the display away from the edge portion of the display in response to the display pointer reaching the edge portion of the display during the continued movement in the first direction. The second direction is different from the first direction.

A user input device is provided. The user input device includes a housing, at least one sensor coupled to the housing and adapted to detect motion of the housing relative to a surface, and a processing system coupled to the at least one sensor. The processing system is adapted to effect movement of a display pointer on a display in response to motion of the housing across the surface and effect continued movement of the display pointer in response to motion of the housing away from the surface.

A method is provided. Movement of a display pointer across a display is effected in response to motion of a mouse device across a surface. Continued movement of the display pointer is effected in response to motion of the mouse device away from the surface if the mouse device is moving across the surface during a selected time period before the object moves away from the surface.

BRIEF DESCRIPTION OF DRAWINGS

The preferred exemplary embodiment of the present invention will hereinafter be described in conjunction with the appended drawings, where like designations denote like elements, and:

FIGS. 5-7 are plan views of the sensing region of FIGS. 2-4 further illustrating the flicking motion of the object;

APPENDICES

Examples of various aspects and features found in several illustrative embodiments are described in the accompanying Appendices which are discussed below, and are incorporated by reference herein in their entirety and form part of the present disclosure.

DETAILED DESCRIPTION OF THE INVENTION

The following detailed description is merely exemplary in nature and is not intended to limit the invention or the application and uses of the invention. Furthermore, there is no intention to be bound by any expressed or implied theory presented in the preceding technical field, background, brief summary or the following detailed description.

The present invention provides an input device and method that facilitates improved usability. Specifically, the input device and method provides a mapping between object motion on the device and the resulting action on the display. As one example, the input device and method emulates the behavior of a mechanical trackball, providing a more enjoyable user experience and improved pointing performance.

Figure 1:
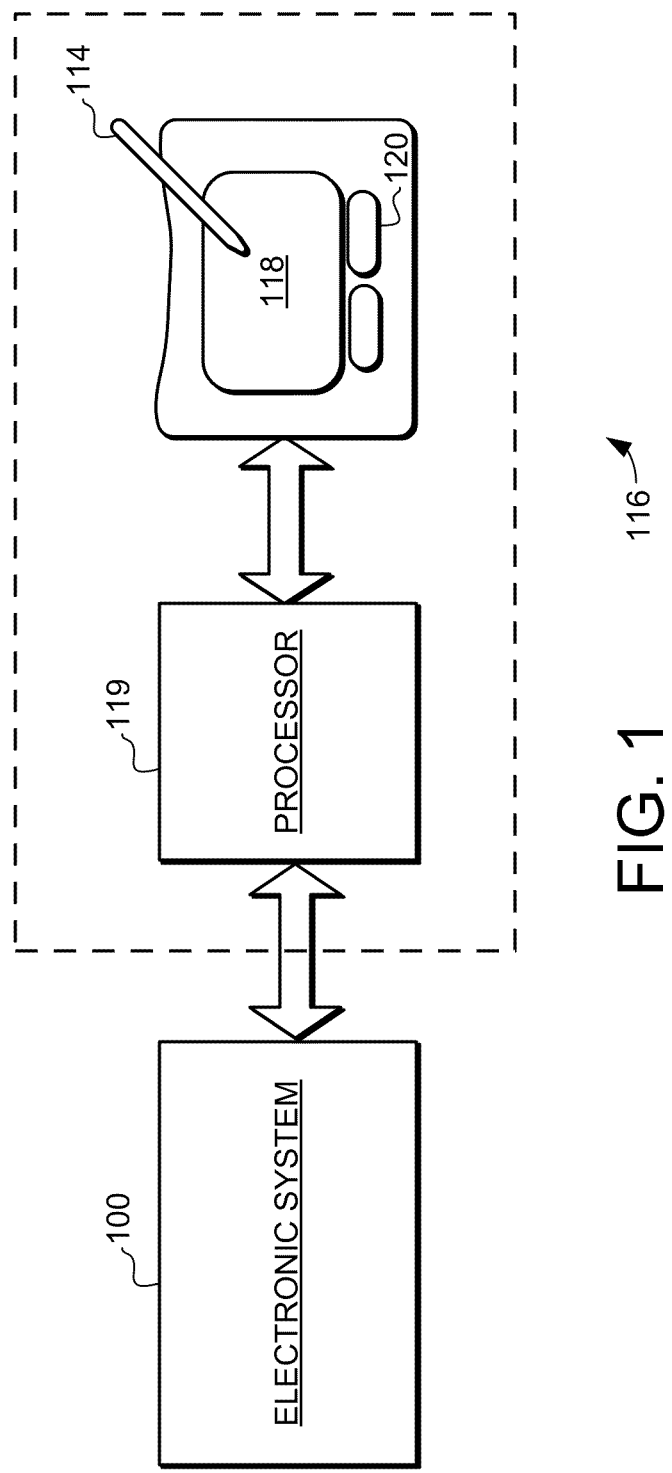
FIG. 1 is a block diagram of an exemplary system including an input device in accordance with an embodiment of the invention.

Turning now to the figures, FIG. 1 is a block diagram of an exemplary electronic system 100 that is coupled to an input device, or proximity sensor device, 116. The electronic system 100 is meant to represent any type of personal computer, portable computer, workstation, personal digital assistant, video game player, communication device (including wireless phones and messaging devices), media device, including recorders and players (including televisions, cable boxes, music players, and video players), digital camera, video camera or other device capable of accepting input from a user and of processing information. Accordingly, the various embodiments of the system 100 may include any type of processor, memory or display. Additionally, the elements of the system 100 may communicate via a bus, network or other wired or wireless interconnection. The input device 116 may be connected to the system 100 through any type of interface or connection, including I2C, SPI, PS/2, Universal Serial Bus (USB), Bluetooth, RF, IRDA, or any other type of wired or wireless connection to list several non-limiting examples.

The input device 116 (e.g., touchpad) includes a processing system (or processor) 119 and a sensing region 118. The input device 116 is sensitive to the position of a stylus 114 or a finger and/or other input object within the sensing region 118. "Sensing region" 118 as used herein is intended to broadly encompass any space above, around, in and/or near the input device 116 in which the sensor of the input device is able to detect a position of the object. In a conventional embodiment, the sensing region 118 extends from the surface of the sensor in one or more directions for a distance into space until signal-to-noise ratios prevent object detection. This distance may be on the order of less than a millimeter, millimeters, centimeters, or more, and may vary significantly with the type of position sensing technology used and the accuracy desired. Other embodiments may require contact with the surface, either with or without applied pressure. Accordingly, the planarity, size, shape and exact locations of the particular sensing regions will vary widely from embodiment to embodiment.

In operation, the input device 116 suitably detects a position of the stylus 114, finger or other input object within the sensing region 118, and using the processing system 119, provides electrical or electronic indicia of the positional information to the electronic system 100. The system 100 appropriately processes the indicia to accept inputs from the user, to move a cursor or other object on a display, or for any other purpose.

The input device 116 includes a sensor (not shown) that utilizes any combination of sensing technology to implement one or more sensing regions 118. The input device 116 may use a variety of techniques for detecting the presence of an object, and may include one or more electrodes or other structures adapted to detect object presence. As several non-limiting examples, the input device 116 may use capacitive, resistive, inductive, surface acoustic wave, and/or optical techniques. Many of these techniques are advantageous to ones requiring moving mechanical structures (e.g. mechanical switches) as they may have a substantially longer usable life. In a common capacitive implementation of a touch sensor device, a voltage is typically applied to create an electric field across a sensing surface. Capacitive input devices detect the position of an object by detecting changes in capacitance caused by the changes in the electric field due to the object. Likewise, in a common resistive implementation, a flexible top layer and a bottom layer are separated by insulating elements, and a voltage gradient is created across the layers. Pressing the flexible top layer creates electrical contact between the top layer and bottom layer. Resistive input devices detect the position of the object by detecting the voltage output due to the relative resistances between driving electrodes at the point of contact of the object. In an inductive implementation, the sensor might pick up loop currents induced by a resonating coil or pair of coils, and use some combination of the magnitude, phase and/or frequency to determine distance, orientation or position. In all of these cases, the input device 116 detects the presence of the object and delivers indicia of the detected object to the device 100. For example, the sensor of the input device 116 may use arrays of capacitive sensor electrodes to support any number of sensing regions 118. As another example, the sensor may use capacitive sensing technology in combination with resistive sensing technology to support the same sensing region or different sensing regions. Examples of the types of technologies that may be used to implement the various embodiments of the invention can be found in U.S. Pat. No. 5,543,591, U.S. Pat. No. 6,259,234 and U.S. Pat. No. 5,815,091, each assigned to Synaptics Inc.

The processing system 119, sometimes referred to as a proximity sensor processor or touch sensor controller, is coupled to the sensor and the electronic system 100. In general, the processing system 119 receives electrical signals from the sensor, processes the electrical signals, and communicates with the electronic system 100. The processing system 119 is adapted to perform a variety of processes on the signals received from the sensor to implement the input device 116. For example, the processing system 119 may select or connect individual sensor electrodes, detect presence/proximity, calculate position or motion information, and report a position or motion when a threshold is reached, and/or interpret and wait for a valid tap/stroke/character/button/gesture sequence before reporting it to the electronic system 100, or indicating it to the user. The processing system 119 may also determine when certain types or combinations of object motions occur proximate the sensor. For example, the processing system 119 may determine the direction in which an object is moving when it lifts from the sensor, and may generate the appropriate indication in response to that motion.

In this specification, the term "processing system" is defined to include one or more processing elements that are adapted to perform the recited operations. Thus, the processing system 119 may comprise all or part of one or more integrated circuits, firmware code, and/or software code that receive electrical signals from the sensor and communicate with the electronic system 100. In some embodiments, all processing elements that comprise the processing system 119 are located together, in or near the sensor 116. In other embodiments, these elements may be physically separated, with some elements of the processing system 119 close to sensor 116, and some elsewhere (such as near other circuitry for the electronic system 100). In this latter embodiment, minimal processing may be performed by the elements near the sensor 116, and the majority of the processing may be performed by the elements elsewhere.

Furthermore, the processing system 119 may be physically separate from the part of the electronic system that it communicates with, or the processing system 119 may be implemented integrally with that part of the electronic system. For example, the processing system 119 may reside at least partially on a processing system performing other functions for the electronic system aside from implementing the input device 116.

Again, as the term is used in this application, the term "electronic system" broadly refers to any type of device that communicates with input device 116. The electronic system 100 may thus comprise any type of device or devices in which a touch sensor device may be implemented or coupled to. The input device 116 may be implemented as part of the electronic system 100, or coupled to the electronic system using any suitable technique. As non-limiting examples, the electronic system 100 may thus comprise any type of computing device, media player, communication device, or another input device (such as another touch sensor device or keypad). In some cases, the electronic system 100 is itself a peripheral to a larger system. For example, the electronic system 100 may be a data input or output device, such as a remote control or display device, that communicates with a computer or media system (e.g., remote control for television) using a suitable wired or wireless technique. It should also be noted that the various elements (processor, memory, etc.) of the electronic system 100 may be implemented as part of an overall system, as part of the touch sensor device, or as a combination thereof. Additionally, the electronic system 100 may be a host or a slave to the input device 116.

In the illustrated embodiment, the input device 116 is implemented with buttons 120. The buttons 120 may be implemented to provide additional input functionality to the input device 116. For example, the buttons 120 may be used to facilitate selection of items using the input device 116. Of course, this is just one example of how additional input functionality may be added to the input device 116. In other implementations, the input device 116 may include alternate or additional input devices, such as physical or virtual switches, or additional proximity sensing regions. Conversely, the input device 116 may be implemented with no additional input devices.

Likewise, the positional information provided by the processing system 119 may be any suitable indicia of object presence. For example, the processing system 119 may be implemented to provide "zero-dimensional" 1-bit positional information, "one-dimensional" positional information (e.g. along a sensing region) as a scalar, "two-dimensional" or "three-dimensional" vector positional information (e.g. horizontal/vertical/depth axes, angular/radial axes, or any other combination of axes that span the two or three dimensions) as a combination of values, and the like. Furthermore, the term "positional information" as used herein is intended to broadly encompass absolute and relative position-type information, and also other types of spatial-domain information such as velocity, acceleration, and the like, including measurement of motion in one or more directions. Various forms of positional information may also include time history components, as in the case of gesture recognition and the like. As will be described in greater detail below, the positional information from the processing system 119 facilitates a full range of interface inputs, including use of the input device 116 as a pointing device for cursor control.

In some embodiments, the processing system 119 may also be adapted to perform other functions in the input device 116. For example, the processing system 119 may be configured to select or connect individual sensor electrodes, detect presence/proximity, calculate position or motion information, and report a position or motion when a threshold is reached, and/or interpret and wait for a valid tap/stroke/character/button/gesture sequence before reporting it to the electronic device 100, or indicating it to the user.

It should be noted that although the various embodiments described herein are referred to as "proximity sensor devices," these terms as used herein are intended to encompass not only conventional input devices, but also a broad range of equivalent input devices that are capable of detecting the position of a one or more fingers, pointers, styli and/or other objects. Such devices may include, without limitation, touch screens, touch pads, touch tablets, biometric authentication devices, handwriting or character recognition devices, and the like. Again, as the term is used in this application, the term "electronic device" broadly refers to any type of device that communicates with input device 116. The electronic device 100 may thus comprise any type of device or devices in which a touch sensor device and may be implemented or coupled to. Accordingly, proximity sensor devices may appropriately detect more than the mere presence or absence of an object and may encompass a broad range of equivalents.

Furthermore, the input device 116 may be implemented as part of the electronic system 100, or coupled to the electronic system 100 using any suitable technique. As non-limiting examples the electronic system 100 could thus comprise any type of computing device, media player, communication device or gaming device. In some cases the electronic system 100 is itself a peripheral to a larger system. For example, the electronic system 100 may be a data input or output device, such as a remote control or display device, that communicates with a computer or media system (e.g., remote control for television) using a suitable wired or wireless technique. It should also be noted that the various elements (e.g., display screen, processor, memory, etc.) of the electronic system 100 may be implemented as part of an overall system, as part of the input device, or as a combination thereof. Additionally, the electronic device 100 may be a host or a slave to the input device 116.

In the embodiments of the present invention, the input device 116 is adapted to provide the ability for a user to easily cause adjustments in an electronic system using the input device 116 as part of a user interface. For example, it may be used to facilitate user interface navigation, such as scrolling, panning, menu navigation, cursor control, and the like. As another example, it may be used to facilitate value adjustments, such as changing a device parameter, including visual parameters such as color, hue, brightness, and contrast, auditory parameters such as volume, pitch, and intensity, operation parameters such as speed and amplification. The input device 116 may also be used for control of mechanical devices, such as in controlling the movement of a machine.

It should also be understood that while the embodiments of the invention are to be described here in the context of a fully functioning proximity sensor device, the mechanisms of the present invention are capable of being distributed as a program product in a variety of forms. For example, the mechanisms of the present invention may be implemented and distributed as a proximity sensor program on a computer-readable signal bearing media. Additionally, the embodiments of the present invention apply equally regardless of the particular type of computer-readable signal bearing media used to carry out the distribution. Examples of signal bearing media include recordable media such as memory sticks/cards/modules, optical and magnetic disks, and hard drives.

In at least some embodiments of the invention, the input device and method are implemented with a mapping between finger (or other object) motion on a input device and the resulting pointer motion on a computer display.

The input device (e.g., touchpad) on most PCs is significantly smaller in size than the display screen. Therefore, moving the display pointer across a large display typically requires either multiple input strokes on the input device or a high gain mapping of input object motion to pointer motion. Multiple input strokes may be slow and fatiguing, while a high gain mapping may lead to poor performance on fine positioning tasks. The current state-of-the art solution to this problem is a nonlinear gain function, typically referred to as a 'ballistic' function, which allows for rapid cursor motion across the screen for quick input object movements and good fine-positioning response for small input object movements.

The techniques described here are intended to further improve long-distance pointer movement across large displays while retaining good fine-positioning response. It is compatible with both multiple input strokes and nonlinear "ballistic" implementations, and may be used simultaneously with either or both.

These techniques may be explained via an analogy with mechanical trackballs. In a system where the motion of a pointer (i.e. cursor) on a display is controlled by the motion of a mechanical trackball, rolling the trackball with a swiping motion of a finger may cause a pointer on a display to move across the display. The trackball may also be spun with a quick flicking motion of the finger to which trackball responds by continuing to spin after the finger has left its surface. Friction may gradually slow the trackball to a stop, or the touch of a finger may halt the trackball immediately. In response to the trackball spinning without any finger contact, the pointer continues to move across the display. Thus, the pointer may be moved large distances across the display with a single quick flicking motion applied to the trackball, rather than with multiple smaller swiping motions of the finger on the trackball.

A similar effect may be implemented in a system where the motion of a displayed item (e.g. pointer/cursor) is controlled by the motion of an input object on the input device. This effect is possible even though input devices are not designed to spin, and not designed to cause cursor motion in response to their own motion. In many input devices, sliding a input object across the input device may cause a pointer on a display to move across the display, and other input object interactions with the input device may cause other responses. In such systems, pointer motion typically depends on the object position sensed close to the input device, and no such object presence typically results in no pointer response. However, the input device may be configured such that a quick flicking motion of the input object causes the cursor to continue moving across the display even after the input object leaves the input device's surface. Further, the input device may be configured such that bringing the input object back down close enough onto the input device effectively 'grabs' the display pointer and immediately stops the continued movement of the display pointer. In most cases, configuration of the input device to achieve these effects may be accomplished by configuring the input device's controller. Compared with the mechanical trackball, such a "virtual" trackball implemented by a input device offers a substantial saving in mechanical complexity and requires much less physical space.

Figure 2:
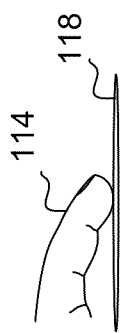
FIGS. 2-4 are side views of a sensing region of the input device of FIG. 1 illustrating a "flicking" motion of an object across a surface thereof.
Figure 3:
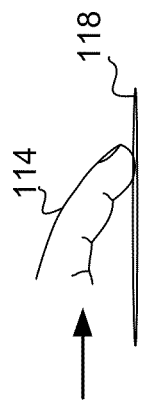
Figure 4:
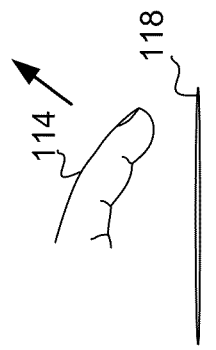

FIGS. 2-12 illustrate operation of the systems and methods described above, according to various embodiments of the present invention. FIGS. 2-4 illustrate one example of the flicking motion described above. As shown in FIG. 2, an input object 114 of a user (or the stylus) is placed into the sensing region 118. FIGS. 2 and 3 illustrate the input object 114 being moved across the sensing region 118, and FIG. 4 illustrates the input object 114 being lifted out of the sensing region 118. Although shown separately, it should be understood that the movement of the input object 114 depicted in FIGS. 2-4 is, in one embodiment, a relatively quick and continuous motion.

FIGS. 5-7 are plan views of the sensing region 118 during the flicking motion illustrated in FIGS. 2-4. The location of the tip of the input object 114 in the sensing region 118 is indicated by interface circle 122, which represents the interface of the input object 114 with the sensing region 118. That is, the circle 122 indicates the particular area of the sensing region 118 in which the input object 114 is placed and moved. The circle 122 in FIG. 7 likewise indicates the particular area of the sensing region 118 where the input object is lifted from. It should be noted that FIGS. 5, 6, and 7 corresponding to FIGS. 2, 3, and 4, respectively. The flicking motion depicted includes the movement of the input object 114 from a lower, left portion 124 of the sensing region 118 towards an upper, right portion 126 of the sensing region 118. After reaching an upper corner 128 of the sensing region 118, the input object 114 is lifted from the sensing region 118, as indicated by the circle 122 being shown in a dashed line. In the embodiment depicted in FIGS. 5-7, after the input object is lifted from the sensing region 118, the circle 122 continues to move towards an upper, corner 128 of the sensing region 118. In FIG. 7, the fact that the input object 114 is no longer in contact with the sensing region 118 is indicated by the circle 122 being shown in a dashed line. It should be understood that the motion of the input object 114 indicated in FIG. 7 is intended to serve only as an example of the movement of the input object 114 after being lifted from the sensing region during a flicking motion. In other embodiments, the input object 114 may move in directions different than one that corresponds to the movement of the pointer as described below, or may not move at all after being lifted from the sensing region 118.

Figure 8:
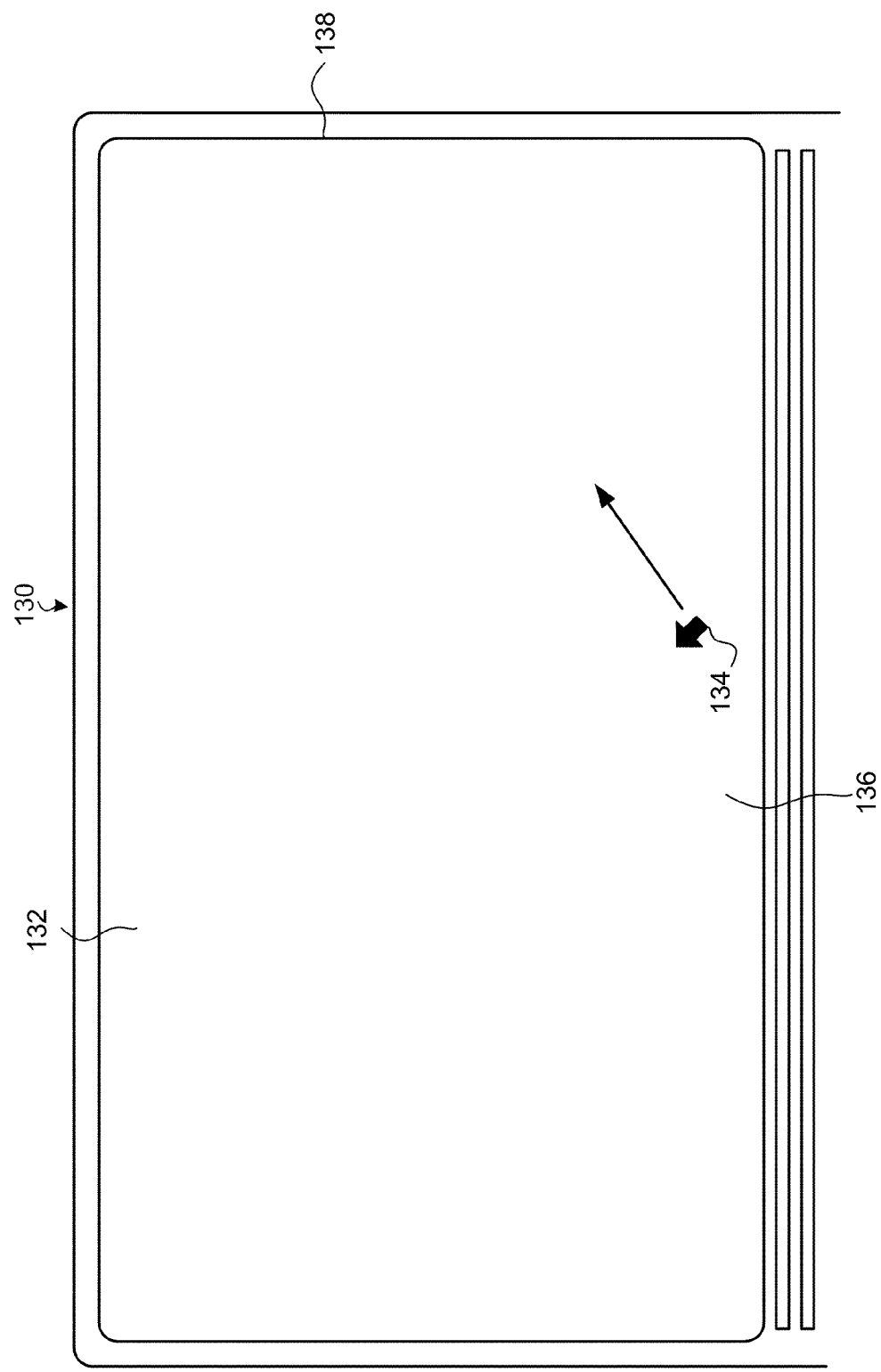
FIGS. 8-12 are plan views of a display illustrating the movement of a display pointer rendered thereon in response to the flicking motion of the object, according to several embodiments of the present invention.
Figure 9:
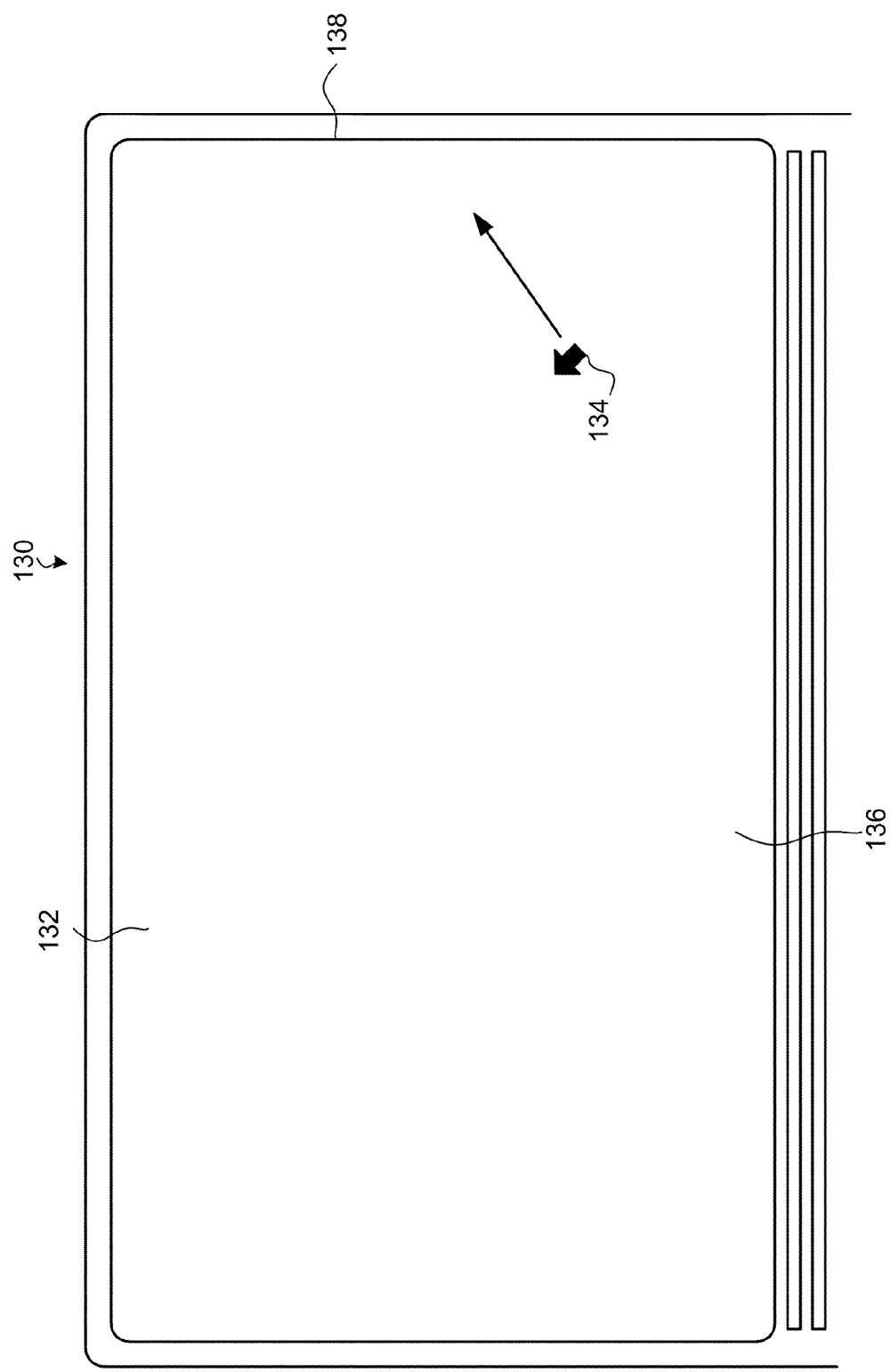

FIGS. 8-12 are plan views of a display device 130, having a display 132, in operable communication with the input device 116 (FIG. 1) illustrating the movements of a display pointer 134 rendered on the display 132 caused by the flicking motion described above. It should be understood that the positions of the display pointer 134 in FIGS. 8, 9, and 10 may or may not correspond to the positions of the interface circle 122 in FIGS. 5, 6, and 7, respectively. In the depicted embodiment, the display pointer 134 is initially located in a lower, central portion 136 of the display 132. Upon detection of the exemplary motion described above, the processing system 119 causes (or effects) the display pointer 134 to move upwards and towards a right edge portion 138 of the display 132, as shown in FIGS. 8 and 9, and is configured such that the display pointer 134 interacts with the edge portion 138 as described below. In one embodiment, the edge portion 138 refers to an edge of the area of the display 132 on which images may be rendered.

As described herein, if certain criteria are met, the display pointer 134 continues to move ("coast" or "glide") towards the right edge portion 138 after the input object 114 is lifted from the sensing region 118. In one embodiment, this continued movement of the display pointer 134 occurs if movement of the input object 114 across the sensing region 118 (e.g., while in contact with the sensor) occurs during a predetermined time period before the input object 114 is lifted from the sensing region 118 and an average speed of the input object 114 across the sensing region 118 during the time period is equal to or above (i.e., at least one of reaches and exceeds) a predetermined speed threshold.

During the continued movement, in one embodiment, the display pointer 134 experiences a "friction" effect such that the movement of the display pointer 134 begins to slow (i.e., a speed thereof is incrementally reduced) at some point after the input object 114 is lifted from the sensing region 118, and eventually stops. In the embodiment depicted in FIGS. 8 and 9, depending on the speed of the flicking motion, as well as the strength of the friction effect, the display pointer 134 may reach the right edge portion 138 of the display 132, as described below. As previously mentioned, in at least one embodiment, the continued movement of the display pointer 134 may be stopped before the display pointer 134 reaches the edge portion 138 by the user returning his or her input object to the sensing region 118 to "grab" the display pointer 134 (i.e., stop the continued movement).

If the display pointer 134 reaches the edge portion 138 during the continued movement, the display pointer 134 "bounces" off the edge portion 138 in one of various ways. However, it should be understood that although the display pointer 134 is described below as bouncing off of the edge, or edge portion itself, in other embodiments the display pointer 134 may bounce, or be redirected, before or after reaching the edge portion 138, and thus may be redirected at any "perceived edge" of the display 132.

Figure 10:
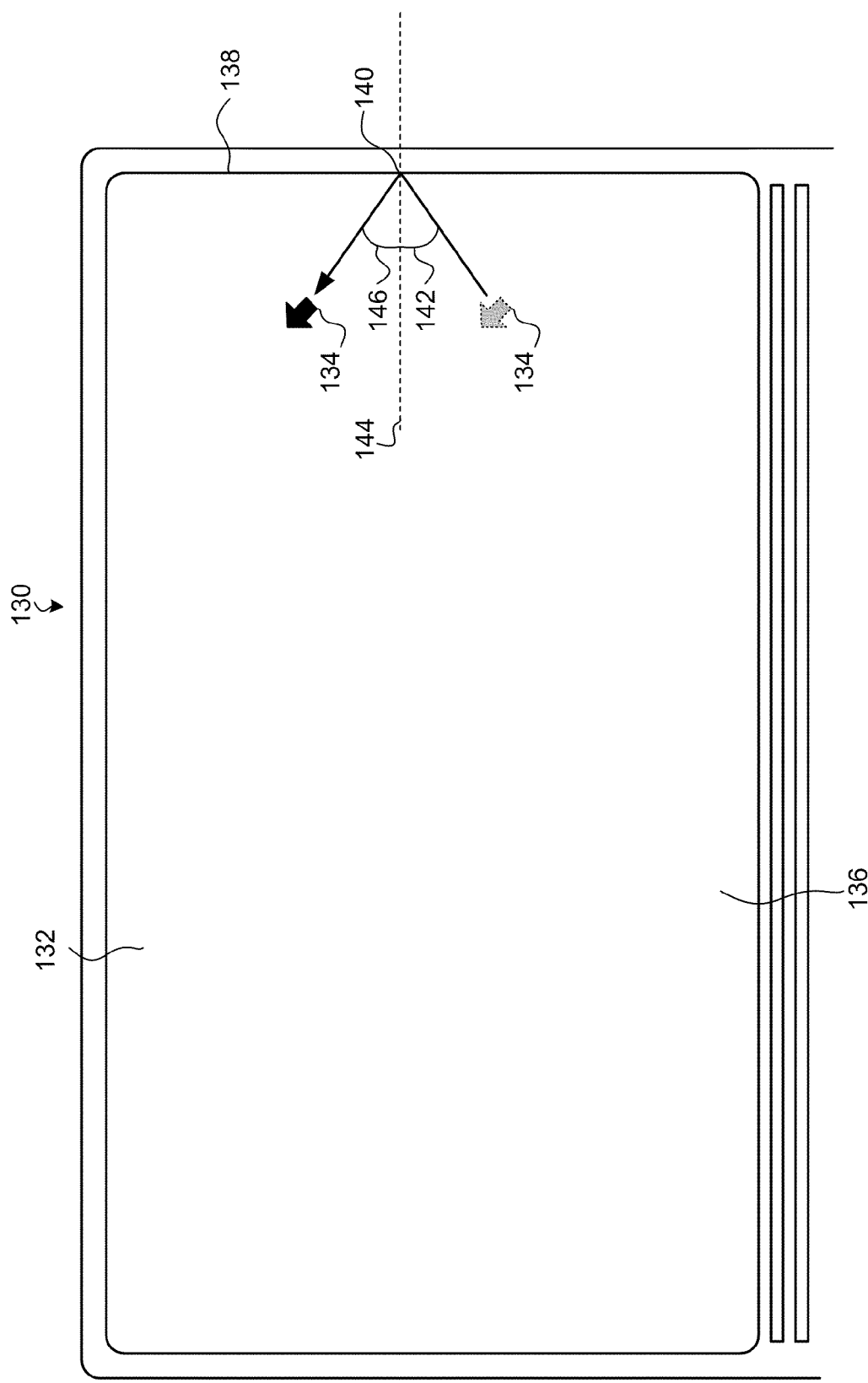

In one embodiment, as shown in FIG. 10, if the display pointer 134 reaches the right edge portion 138 of the display 132 during the continued movement, the display pointer 134 "bounces off" or is "reflected by" the edge portion 138 of the display 132 in a manner similar to a ray of light being reflected from a reflective surface. Referring specifically to FIG. 10, the display pointer 134 reaches the right edge portion 138 at a contact point 140. As indicated in FIG. 10, an analogy between the behavior of the display pointer 134 and visible light may be made. As such, an "angle of incidence" 142 may be defined between the direction of the continued movement of the display pointer 134 before reaching the edge portion 138 and a line 144 that is normal, or perpendicular, to the edge portion 138 at the contact point 140. As shown, after bouncing off of the edge portion 138, an "angle of reflection" 146 may be defined between the direction of the continued movement after the display pointer 134 bounces off of the edge portion 138 and the line 144. In one embodiment, the angles of incidence and reflection 142 and 146 are equal (or substantially equal) in magnitude.

Figure 11:
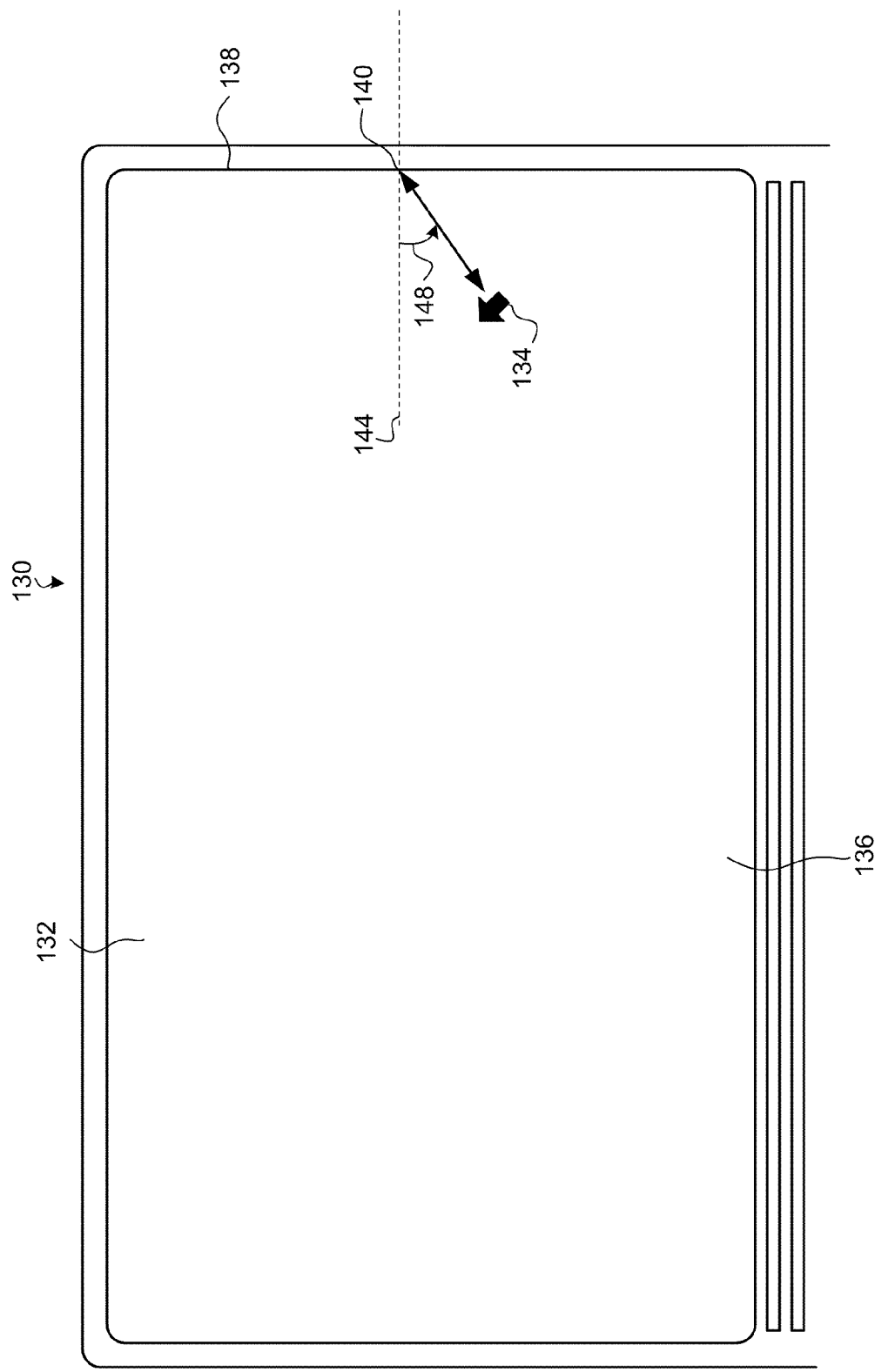

In another embodiment, as shown in FIG. 11, if the display pointer 134 reaches the right edge portion of the display 132 during the continued movement, the display pointer 134 bounces off of the edge portion 138 of the display 132 in a direction that is opposite (or substantially opposite) to the direction of the continued movement before the display pointer 134 reaches the edge portion 138. Referring specifically to FIG. 11, the display pointer 134 reaches the right edge portion 138 at the contact point 140, but rather than being reflected in such a way that the upwards movement continues, the display pointer 134 is redirected downwards, in the direction from which it reached the edge portion 138. In such an embodiment, an "angle of redirection" 148 may be defined between the directions of the continued movement before and after the display pointer 134 reaches the edge portion 138 and the line 144 normal to the edge portion 138 at the contact point 140. This embodiment may also be understood as having the angles of incidence and reflection 142 and 146, described in reference to FIG. 10, as being not only equal in magnitude, but also congruent.

Figure 12:
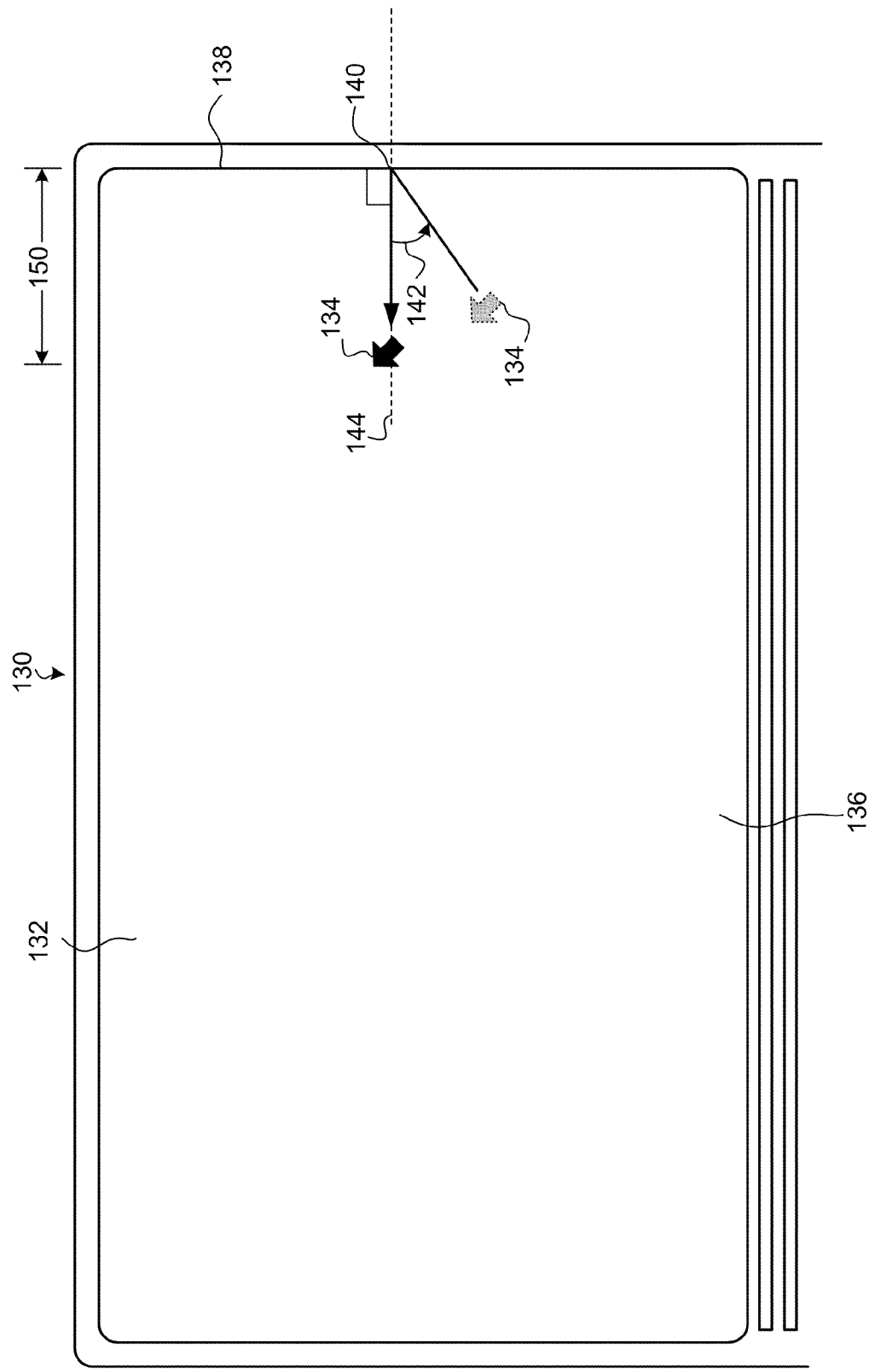

In a further embodiment, as shown in FIG. 12, regardless of the direction of the continued movement before the display pointer 134 reaches the edge portion 138 of the display 132, the display pointer 134 bounces off of the edge portion 138 in a direction that is perpendicular to the edge portion 138. Referring specifically to FIG. 12, the display pointer 134 reaches the edge portion 138 at the contact point 140 and is redirected in a direction that is parallel (and/or congruent) with the line 144 that is normal to the edge portion 138 at the contact point 140.

As described in detail below, the system may provide the user with various adjustable settings to alter the behavior of the display pointer 134. Of particular interest, the speed at which the sensor moves the display pointer 134 during and after the flicking motion may be adjusted with a multiplier. The speed at which the display pointer bounces off the edge portion 138 of the display 132 may also be set to a specified value, causing the display pointer 134 to bounce off of the edge portion 138 of the display 132 at a set speed, regardless of the speed of the display pointer 134 before reaching the edge portion 138. In such an embodiment, the continued movement of the display pointer 134 may be ceased by the friction effect described above (i.e., the friction value is set to a non-zero value). As a result, in such an embodiment, the display pointer 134 may stop moving when it meets or passes a distance threshold 150 (FIG. 12), as dictated by the speed at which the display pointer 134 bounces off of the edge portion 138 and the friction value. The time period used to determine whether or not a flicking motion has occurred (i.e., the time period over which the average speed of the object 114 is measured) may also be adjusted.

Figure 13:
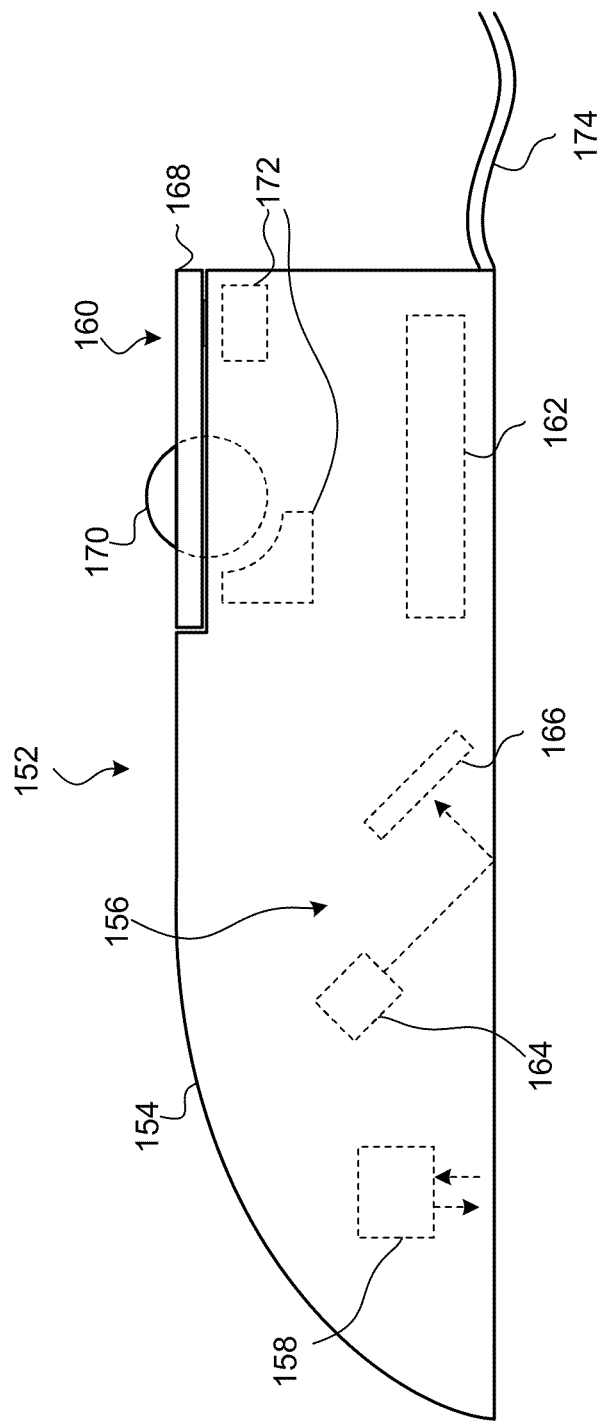
FIG. 13 is a schematic side view of a mouse device, according to another embodiment of the present invention.

It should be understood that these features are not limited to proximity sensor devices, and may be implemented for other types of input devices, such a computer mouse. FIG. 13 illustrates a computer mouse, or mouse device, 152 in which one or more of the features described herein may be implemented, according to an embodiment of the present invention. The mouse device 152 includes a housing 154, sensor system 156, an input system 160, and a mouse processing system (or processor) 162. The housing 154 is made of, for example, a hard plastic and forms the body of the mouse 152. The sensor system 156 includes at least one sensor configuration. In one embodiment, the sensor configuration includes a light emitting diode (LED) 164 and an optoelectronic sensor 166 that are configured such that light from the LED 164 is reflected by a surface (not shown), such as a table top or mouse pad, across which the housing 154 may be moved, and directed into the optoelectronic sensor 166. The optoelectronic sensor 166 detects the motion of the housing 154 by taking successive images of the surface which are processed by image processing circuitry (e.g., within the mouse processing system 162). In one embodiment, the sensor system 156 is also configured to sense the housing 154 moving away from (and/or towards) a surface by the optoelectronic sensor 166 detecting a reduction in image quality, which is associated with the light reflected from the surface, from which the housing is moving away. As such, the mouse device 152 is capable of detecting decreases, as well as increases, in the proximity of the housing 154 to the surface.

In other embodiments (as shown in FIG. 13), the sensor system may include a second sensor 158 to detect movement of the housing 154 away from the surface. The second sensor 158 includes, for example, an infrared emitter/detector configured to emit infrared light onto the surface and detect the reflection thereof. If the amount of infrared light captured by the detector drops below a particular threshold, it may be assumed that the mouse 152 has been lifted from the surface, as is commonly understood. The input system 160 may include one or more buttons 168, a scroll wheel 170, and actuation sensors 172. As is commonly understood, a user may generate input via the buttons 168 and the wheel 170 which is detected by the actuation sensors 172. Signals from the sensor system 156 (and in some embodiments sensor 158) and the input system 160 are received and processed by the mouse processing system 162 before being transmitted to a host system (e.g., the electronics system 100) through a cable 174 or a wireless connection.

In the embodiment of the mouse 152 shown in FIG. 13, lifting actions of the housing 154 may be equated to the object (e.g., input object 114) being lifted from the sensing region 118. That is, in one embodiment, the mouse 152 is configured such that lifting the housing 154 of the mouse 152 invokes cursor motion resulting from continued movement and friction as described above, which may be further combined with the bouncing of the display pointer from the edges of the display screen.

Turning now to appendix 1, appendix 1 shows a program listing of one possible implementation of the virtual trackball on an exemplary input device for interaction with human input objects, which implements at least some of the features described above, as well introduces additional features. This example is implemented in the Python programming language using the Synaptics touchpad pointing device driver COM API running on Microsoft WINDOWS operating system, which is available from Microsoft Corporation of Redmond, Wash. However, it should be noted that this is just one example implementation, and that other implementations are also possible. For example, in some typical applications, similar algorithms would likely reside in the device driver for the input device.

In appendix 1, lines 11-15 define five parameters that control the behavior of the implementation. The 'speed' parameter controls how fast the display pointer moves after being flicked, and acts as a multiplier on the speed during the flick motion. The 'friction' parameter controls how quickly the display pointer coasts to a stop after the input object has been removed from the input device. The remaining three parameters will be described later in this document.

The HistoryBuffer class defined in lines 17-48 stores historical sequences of data that are used by the implementation.

Lines 54 and 55 define instances of the HistoryBuffer class for storing the 'DeltaX' and 'DeltaY' values in "mickeys" that are reported to the operating system by the Synaptics device driver. After a transformation via suitable ballistics within the Windows operating system, these values control the movement of the display pointer.

The GetCursorPosition( ) function in lines 57-65 returns the X, Y position of the display pointer on the main display.

The ComputeFlickVector( ) function in lines 67-84 determines the general speed and direction of the flick gesture whenever the user's input object leaves the input device surface. It will be described in more detail later in this document.

The SynAPI class defined in lines 86-105 provides a wrapper for communicating with an appropriate device driver via its COM API.

The SynDevice class defined in lines 107-194 provides a wrapper for communicating with a particular input device via the COM API. It also implements the functionality of the virtual trackball, as will be described in greater detail below.

Looking now at the main program in lines 196-207, the program first creates a SynAPI object, and then a SynDevice object representing the input device. It then goes into an infinite loop waiting for data to arrive from the input device, and calling SynDevice.Coast( ) approximately once every 6 milliseconds.

A packet arriving from the input device invokes the SynDevice.OnPacket( ) function in lines 135-148. Here, the program simply stores the DeltaX and DeltaY values in mickeys, along with the current state of the input device buttons and gestures. It then stores the current state of input object presence on the input device in the Boolean variable 'bFinger', and retains the value of 'bFinger' from the preceding packet in 'bFingerLast'. If bFinger is False and bFingerLast is True, then the input object has just left the input device, indicating that the user may have intended to initiate a flick gesture. In that case, the ComputeFlickVector( ) function is called to determine whether or not to initiate coasting. Note that this is all the processing performed when a packet arrives from the input device. The display pointer itself is updated by the Synaptics device driver in its normal fashion. The OnPacket( ) function just takes note of the packets as they arrive, storing relevant information, but not taking any action.

The ComputeFlickVector( ) function returns two values representing the intended coasting speed in the X and Y directions, respectively. If these values are zero, then no coasting will occur. Looking at the ComputerFlickVector( ) function itself in lines 76-84, it can be seen that the algorithm looks through the HistoryBuffers storing the DeltaX values and DeltaY values. It looks back only as far a specified by the 'lookback' parameter, or until it finds a packet with zero motion deltas. In the present implementation, the 'lookback' parameter is set to 10.

The historical motion deltas are summed to generate a total vector representing the motion of the input object just before it left the surface of the input device. This vector is normalized in line 84 so that its magnitude is independent of the number of packets used in its computation, and scaled by the 'speed' parameter.

Line 83 checks that a minimum number of historical motion packets were available for computing the flick vector. If fewer than 4 packets were available, then the user's input object motion was probably a simple tap not intended to initiate coasting. In this case, the algorithm returns a zero flick vector so that coasting is not initiated.

At periodic intervals of approximately 6 milliseconds, the SynDevice.Coast( ) function in lines 189-194 is called by the program's main loop. This function checks to see if the flick vector is larger than 0.5 in either the X or Y directions, and if the input object is off the input device's surface. If both of these conditions are true, then coasting is invoked by calling SynDevice.Friction( ), SynDevice.Bounce( ), and SynDevice.MovePointer( ) in succession.

SynDevice.Friction( ) (lines 150-152) reduces the magnitude of the flick vector by a 'friction' parameter, causing the display pointer to gradually coast to a stop over the course of several invocations of SynDevice.Coast( ).

SynDevice.Bounce( ) (lines 154-173) causes the display pointer to appear to bounce off the edges of the display, rather than moving off the edge or sticking to the edge. The current implementation (with 'bouncespeed' equal to 0) simply reflects the direction of motion of the display pointer when it reaches an edge of the display, and reduces its speed by a factor named 'elasticity'.

SynDevice.MovePointer( ) (lines 175-187) uses the integer portion of the current flick vector to move the display pointer in lines 179-182. Lines 176-177 and 184-187 store the unused fractional portion of the flick vector and carry it over into the next packet for subsequent use. This allows for pointer motion of less than one mickey per packet.

In the listing of appendix 1, if the 'bouncespeed' parameter is non-zero, then the display pointer will bounce off the display edge with a fixed maximum speed, regardless of the speed with which it approaches the edge. The result is that pointer coasts to a stop at a predetermined distance from the edge of the display. Many screen elements such as the Windows taskbar are positioned at a fixed distance from the display edge, so a quick flick of the pointer to a display edge may cause it to bounce off and come to a stop right in the middle of a screen element. This behavior facilitates the selection or manipulation of screen elements near the edge of the display. If necessary, the fixed bounce speed may be adjusted based on the screen resolution, icon size, etc. in order to optimize performance.

Further code could be added to filter out unintentional input object motions that might otherwise be interpreted as flicks. For example, coasting could be prohibited after very long input object motions, or after input object motions that do not follow an approximately straight trajectory.

Turning now to appendix 2, appendix 2 shows a second exemplary program listing of another implementation of the virtual trackball on a proximity sensor device. This implementation operates in manner similar to that described with reference to appendix 1, with some modifications. For example, in the first implementation described (e.g. the implementation described with reference to appendix 1), if a user "swirled" an input object in circular motions on an input device and then lifted the input object, the cursor would continue its motion with continued movement and friction, just as it would if a flicking input was applied to the input device with a linear flick. However, the direction of the cursor movement after such swirling inputs may appear to be random to, and unexpected by, the user. This apparent randomness is a result of the period of averaging that is done while the user has the input object down on the input device, prior to lifting the input object from the input device. This averaging is used by the appendix 1 embodiment to set the direction for the cursor's continued movement after the user lifts the input object from the input device, when continued movement is applied to the cursor. With this averaging approach, the direction set is often different from the direction the input object was moving the instant before lifting off of the input device, where the input object was engaged in non-linear motion.

There are several solutions to this problem. One solution is to (a) detect that the direction of the input object motion has been changing rapidly during the averaging period, and (b) if such rapid changing of direction is detected, to suppress cursor motion when the input object is lifted (e.g. thus suppressing the continued movement applied to the cursor in response to flicking-type motions). Another solution is to (a) detect that the direction of the input object motion has been changing rapidly during the averaging period, and (b) if such rapid changing of direction is detected, compute a new direction using a much smaller averaging window. This smaller averaging window may be based on the reported positions during a smaller time span, be based on a number of the last reported positions before the input object is lifted, or some other criterion. This latter solution sets for the subsequent cursor motion a direction much closer to the direction the cursor was moving the instant before the input object was removed from the touch pad. Exemplary algorithms for implementing these solutions are found in appendix 2 using ComputeFlickVector, IsStartOfStroke, and AccumulateCurvature functions.

Some proximity sensor devices are configured to provide edge motion that enables motion of the cursor even when there is little or no motion of any input object. These devices typically identify edge regions about the outside bounds of their sensing regions (e.g. around the perimeter of a 2D projection of the sensing region of a planar input device). If an input object enters into this edge region (which may be because the input object bumped into a input device's bezel), edge motion is activated, and the cursor continues. The cursor may continue moving as long as the input object remains in the edge region. Oftentimes, this continued motion is with a preset velocity, such that the direction of this movement is not well correlated with the direction of input object motion before the input object stopped in the edge region. Such edge motion may feel clumsy to some users not accustomed to the edge motion, and may be too slow to some users.

Edge motion on the virtual trackball may seem to contradict the analogy to the mechanical trackball, since a still input object on a trackball results in no trackball motion and thus no cursor motion. However, in some embodiments of the "virtual trackball," such edge motion may be enabled without breaking the mental model a user may have of the input device. In some embodiments of the present invention, continued movement with simulated friction is combined with enabled edge motion to provide improved usability. For example, the continued movement and friction techniques described above may be combined with edge detection techniques of edge motion. In these embodiments, if a input object is moved across the input device and enters into an edge region (e.g. as would happen if the input object motion was stopped because the input object bumped into a bezel around the input device), the cursor motion continues the same way to would had the user flicked the cursor to activate continued movement with friction. One way to implement this would be to configure the proximity sensor device such that it responds to the input object entering an edge region in a similar way to the input object being removed from the surface of the input device; in both cases, the cursor motion continues with continued movement and friction. Using this method provides a natural feel to the cursor motion and allows the cursor to continue to in the user's intended direction. Appendix 2 contains exemplary code for implementing this feature.

The input device may also be implemented to combine continued movement with friction, edge motion, and dragging in particular ways. In these embodiments, the input device is implemented with continued movement with friction and edge motion as described above. The proximity sensor device may be adapted such that edge motion is applied at all times, or only when dragging an object on the display. In any case, enabling edge motion and dragging facilitates a natural usage model that can be quickly discovered and adopted by users. For example, a user may flick a dragged object towards its intended location by simply moving the input object across the input device without considering when to lift the input object—the user may continue moving the input object until the input object touches a input device bezel or some other indication of the edge of the input device. If the dragged object overshoots the target area on the display, the user may simply apply reverse input object motion, thus causing the object to be pulled back toward the intended target location. Alternatively, if the simulated friction causes cessation of the continued movement of the dragged object, and the dragged object falls short of the target location, the user may further flick the dragged object by backing the input object away from the bezel and reapplying a flicking motion (e.g. by again bumping into the bezel) towards the target. Since the backing movement from the edge of a particular distance triggers a smaller amount of cursor motion than flicking movement of the same distance, the object would move closer toward the target. Repetitions can occur as few or as many times as needed.

The edge motion techniques described above provide options for enabling edge motion and incorporating the concepts of continued movement and friction. However, with some types of edge motion implementations, there may be confusing artifacts. For example, if an input object enters the edge region of a input device even when the user does not want to trigger edge motion, the cursor may still move with continued movement. Where the user is moving the cursor, and triggers edge motion when the cursor has moved the cursor close to the target location, this motion may cause the cursor to overshoot the target location. Further, the response of the user may be to "pull" the cursor back, by moving the cursor away from the edge region by backing the input object away from the edge region, and then trying again (which may result in a repetition of the undesired edge motion). This sequence of events (edge motion and pulling back) may cause the user to feel like he/she is having a tug-of-war with the cursor, which is unpleasant and likely slows the user down.

To alleviate this, the input device may be implemented such that no continued movement is applied when a user reverses the direction of input object motion. In this implementation, if a input object enters the edge region and then reverses direction (e.g. when a user is trying to "pull back" the cursor), the input device immediately stops the part of the cursor motion resulting from the continued movement, and causes cursor motion as if the input device is directly tracking the input object. With such an implementation, when the cursor is moving with continued movement (e.g. where the input object is in the edge region), and the input object motion reverses direction on the input device, the cursor movement from continued movement stops and the cursor motion immediately directly tracks the input object.

In one particular embodiment, the input device is implemented as a domed sensor that is illuminated. This provides an illuminated, trackball-like device that improves over mechanical trackballs that are prone to mechanical failure, e.g. from rollers gunking up or grit scratching the ball. The illuminated domed sensor may use a variety of different electrode patterns, such as a soccer ball pattern, to facilitate object proximity detection. The sensor may be illuminated to display a changing pattern across a surface of the domed sensor. When the virtual trackball is "moved," (actually an input object moved on the surface of the non-spinning virtual dome" the illumination may be modulated to mimic the movements associated with a mechanical trackball. The illumination may be achieved with a variety of devices, such as an array of RGB LEDS, which may be placed underneath a transparent domed sensor.

Such a transparent domed sensor may be implemented as described above. For example, with adjustable friction settings (e.g., Frictionless—a flick will keep it simulating ball spinning forever; Intermediate settings—a flick will start it simulating spinning for some time, as it slows to a stop based upon amount of simulated friction specified; Max friction setting—a flick will result in no free spinning, and a finger/hand/other input object must be used to "move" the virtual trackball.)

Such a device may applied to a variety of systems, such as automobile interfaces, gaming devices (i.e., arcade games), desktop pointing devices, and kiosks.

The embodiments and examples set forth herein were presented in order to best explain the present invention and its particular application and to thereby enable those skilled in the art to make and use the invention. However, those skilled in the art will recognize that the foregoing description and examples have been presented for the purposes of illustration and example only. The description as set forth is not intended to be exhaustive or to limit the invention to the precise form disclosed. Many modifications and variations are possible in light of the above teaching without departing from the spirit of the forthcoming claims.

What is claimed is:

1. An input device comprising:
    a sensing system adapted to detect motion of an object on a surface within a sensing region; and
    a processing system coupled to the sensing system, the processing system adapted to:
        effect movement of a display pointer on a display in a first direction in response to motion of the object on the surface, wherein the movement of the display pointer substantially corresponds to the motion of the object on the surface;
        effect continued movement of the display pointer in the first direction in response to the object being removed from the surface;
        effect movement of the display pointer in a second direction on the display in response to the display pointer reaching an edge portion of the display during the continued movement in the first direction, the second direction being different from the first direction; and
        effecting cessation of the continued movement of the display pointer when the object is brought back within the sensing region after the object had been previously removed from the sensing region;
    wherein the continued movement of the display pointer in the first direction is at a first speed, the movement of the display pointer in the second direction is initially at a non-zero second speed and the second speed is a specified non-zero value based on at least one of a resolution of the display and a size of a screen element rendered by the display.

2. The input device of claim 1, wherein the first direction is towards the edge portion of the display and the second direction is away from the edge portion of the display.

3. The input device of claim 2, wherein the first direction defines an angle of incidence and the second direction defines an angle of reflection, and wherein the angle of incidence and the angle of reflection have substantially equal magnitudes.

4. The input device of claim 2, wherein the second direction is substantially perpendicular to the edge portion of the display.

5. The input device of claim 2, wherein the processing system is further adapted to effect cessation of the movement in the second direction when a distance between the display pointer and the edge portion of the display at least one of reaches and exceeds a predetermined threshold greater than zero.

6. The input device of claim 2, wherein the continued movement of the display pointer in the first direction is at a first speed and the movement of the display pointer in the second direction is at a second speed, wherein the second speed is fraction of the first speed.

7. A method comprising:
    effecting movement of a display pointer on a display in a first direction towards an edge portion of the display in response to detecting motion of an object on a surface having a sensing region, wherein the movement of the display pointer substantially corresponds to the motion of the object on the surface;

effecting continued movement of the display pointer in the first direction in response to detecting the object leaving the surface if the object is moving during a selected time period before the object leaves the surface;

effecting continued movement of the display pointer in a second direction on the display away from the edge portion of the display in response to the display pointer reaching the edge portion of the display during the continued movement in the first direction; and effecting cessation of the continued movement of the display pointer when the object is brought back within the sensing region after the object had been previously removed from the sensing region;

wherein the continued movement of the display pointer in the first direction is at a first speed, the movement of the display pointer in the second direction is initially at a non-zero second speed, and the second speed is a specified non-zero value based on at least one of a resolution of the display and a size of a screen element rendered by the display.

8. The method of claim 7, wherein the first direction defines an angle of incidence and the second direction defines an angle of reflection, and wherein the angle of incidence and the angle of reflection have substantially equal magnitudes.

9. The method of claim 7, wherein the second direction is substantially perpendicular to the edge portion of the display.

10. The method of claim 7, wherein the processing system is further adapted to effect cessation of the movement in the second direction when a distance between the display pointer and the edge portion of the display at least one of reaches and exceeds a predetermined distance threshold greater than zero.

11. The method of claim 7, wherein the continued movement of the display pointer in the first direction is at a first speed and the movement of the display pointer in the second direction is at a second speed, wherein the second speed is a fraction of the first speed.

12. The method of claim 7, wherein the continued movement of the display pointer in the first direction is effected only if a speed of the display pointer during the selected time period at least one of reaches and exceeds a predetermined speed threshold.

13. The method of claim 12, wherein the speed of the display pointer during the selected time period is an average speed over the time period.

14. A program product comprising:
an input device program adapted to:
  detect motion of an object on a surface of an input device within a sensing region;
  effect movement of a display pointer on a display in a first direction towards an edge portion of the display in response to motion of the object on the surface, wherein the movement of the display pointer substantially corresponds to the motion of the object on the surface;
  effect continued movement of the display pointer in the first direction in response to the object being removed from the surface within a selected time period of the motion of the object on the surface; and
  effect movement of the display pointer in a second direction on the display away from the edge portion of the display in response to the display pointer reaching the edge portion of the display during the continued movement in the first direction, the second direction being different from the first direction;
  effecting cessation of the continued movement of the display pointer when the object is brought back within the sensing region after the object had been previously removed from the sensing region;
  wherein the continued movement of the display pointer in the first direction is at a first speed, the movement of the display pointer in the second direction is initially at a non-zero second speed, and the second speed is a specified non-zero value based on at least one of a resolution of the display and a size of a screen element rendered by the display; and
non-transitory computer-readable media bearing the input device program.

15. The program product of claim 14, wherein the first direction defines an angle of incidence and the second direction defines an angle of reflection, and wherein the angle of incidence and the angle of reflection have substantially equal magnitudes.

16. The program product of claim 14, wherein the second direction is substantially perpendicular to the edge portion of the display.

17. The program product of claim 14, wherein the input device program is further adapted to effect cessation of the movement in the second direction when a distance between the display pointer and the edge portion of the display at least one of reaches and exceeds a predetermined distance threshold greater than zero.

18. The program product of claim 14, wherein the continued movement of the display pointer in the first direction is effected only if a speed of the display pointer during the selected time period at least one of reaches and exceeds a predetermined speed threshold.

19. The program product of claim 18, wherein the speed of the display pointer during the selected time period is an average speed over the time period.

20. A user input device comprising:
a housing;
at least one sensor coupled to the housing and adapted to detect motion of the housing relative to a surface; and
a processing system coupled to the at least one sensor, the processing system adapted to:
  effect movement of a display pointer on a display in response to motion of the housing across the surface, wherein the movement of the display pointer substantially corresponds to the motion of the housing relative to the surface; and
  effect continued movement of the display pointer in response to a decreased proximity of the housing with the surface wherein the continued movement of the display pointer is in a first direction towards an edge portion of the display; and
  effect cessation of the continued movement of the display pointer when the housing is brought back within a region of the surface after the housing had been previously removed from the region of the surface; and
  effect movement of the display pointer in a second direction away from the edge portion of the display in response to the display pointer reaching the edge portion of the display during the continued movement in the first direction, the second direction being different from the first direction;
  wherein the continued movement of the display pointer in the first direction is at a first speed, the movement of the display pointer in the second direction is initially at a second speed, and the second speed is a specified non-zero value based on at least one of a resolution of the display and a size of a screen element rendered by the display.

21. The user input device of claim 20, wherein the first direction defines an angle of incidence and the second direction defines an angle of reflection, and wherein the angle of incidence and the angle of reflection have substantially equal magnitudes.

22. The user input device of claim 20, wherein the at least one sensor comprises:
   a first sensor coupled to the housing and adapted to detect motion of the housing across the surface; and
   a second sensor coupled to the housing and adapted to detect motion of the housing away from the surface.

23. The user input device of claim 20, wherein the processing system is further adapted to effect a reduction in a speed of the display pointer during the continued movement of the display pointer.

24. A method comprising:
   effecting movement of a display pointer across a display in response to motion of a mouse device across a surface, wherein the movement of the display pointer substantially corresponds to the motion of the mouse device on a region of the surface; and
   effecting continued movement of the display pointer in response to a decreased proximity of the mouse device with the surface if the mouse device is moving across the surface during a selected time period before the decrease in the proximity of the mouse device with the surface, wherein the continued movement of the display pointer is in a first direction towards an edge portion of the display;
   effecting cessation of the continued movement of the display pointer when the mouse device is brought back within the region after the mouse had been previously removed from the sensing region; and
   effecting movement of the display pointer in a second direction away from the edge portion of the display in response to the display pointer reaching the edge portion of the display during the continued movement in the first direction, the second direction being different from the first direction;
   wherein the continued movement of the display pointer in the first direction is at a first speed, the movement of the display pointer in the second direction is initially at a second speed, and the second speed is a specified non-zero value based on at least one of a resolution of the display and a size of a screen element rendered by the display.

25. The method of claim 24, wherein the first direction defines an angle of incidence and the second direction defines an angle of reflection, and wherein the angle of incidence and the angle of reflection have substantially equal magnitudes and further comprising effecting cessation of the movement in the second direction when a distance between the display pointer and the edge portion of the display at least one of reaches and exceeds a predetermined threshold greater than zero.

26. The method of claim 24, further comprising effecting an reduction in a speed of the display pointer during the continued movement of the display pointer.

* * * * *